Sept. 1, 1925.  G. MICHELL  1,551,898

FISH TAPE GRIP

Filed Aug. 21, 1924

George Michell Inventor

Patented Sept. 1, 1925.

1,551,898

UNITED STATES PATENT OFFICE.

GEORGE MICHELL, OF TACOMA, WASHINGTON.

FISH-TAPE GRIP.

Application filed August 21, 1924. Serial No. 733,304.

*To all whom it may concern:*

Be it known that I, GEORGE MICHELL, a citizen of the United States, residing at the city of Tacoma, in the county of Pierce and State of Washington, have invented a new and useful Improvement in Fish-Tape Grips, of which the following is a specification.

My invention relates to devices for inserting and pulling steel fish tapes and electric wires through wire conduits. The objects of my invention are, First, to provide a tool with which the electrician can secure a firm grip on and in alignment with the steel fish tape when inserting or pulling the same through a tubular conduit; and Second, to obtain a secure grip on a fish tape without kinking the same and secure a straight pull or push thereon.

I attain these objects by means of the device illustrated in the accompanying drawing, in which,—

Figures 1, 2:
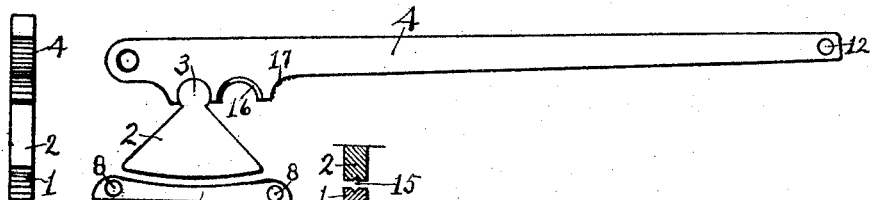
Figures 3, 4:
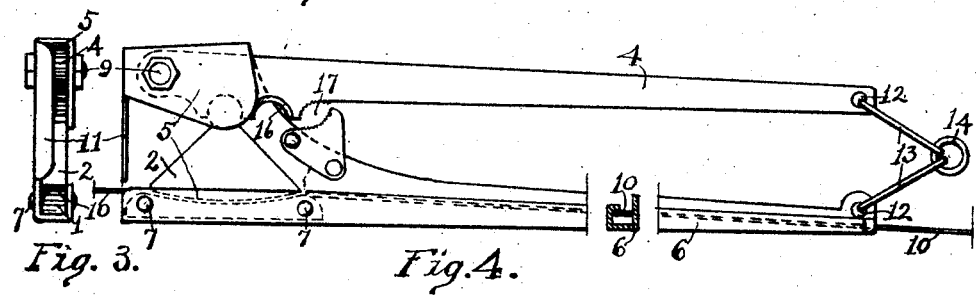
Figure 5:
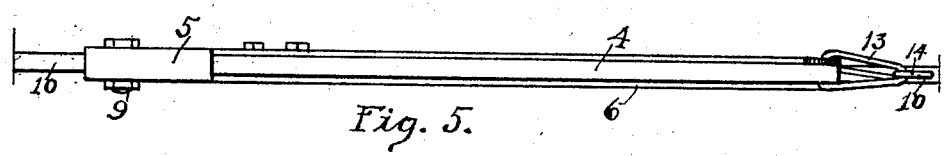
Figure 6:
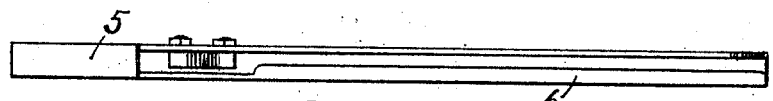

Figure 1 is an end and Fig. 2 is a side view of grip parts of my invention; Fig. 3 is an end and Fig. 4 is a side view of the complete invention as in use; Fig. 5 is a top view of complete invention; and Fig. 6 is a top view of the invention with the lever arm 4 removed.

Similar characters refer to similar parts of the several views.

Heretofore, fish tapes and electric wires have been inserted and drawn into conduits by hand. The fish tape being small and of hard spring steel, often injuries to the hands occur when the pulling is hard. At times it is necessary to grip hold of the tape with pliers or other tools, and the tape is frequently kinked or broken. This causes a loss of the tape and of time, each of which is valuable. The pliers only secure a diagonal hold on the tape or wire and a straight forward pull cannot be secured.

With my newly invented fish tape grip, a firm grip can be secured and maintained on the steel fish tape without kinking or damaging the same when a straight forward pull is put thereon with great force.

My newly invented fish tape grip comprises a base piece 1 made slightly concave, and a clamping piece 2 slightly convex to conform with the concave base piece 1. The piece 2 is made with circular head 3 fitted into a circular opening in the lower edge of a lever arm 4. This provides a pivotal bearing whereby the clamping piece 2 will adjust itself when clamped onto the foot piece 1.

These gripping parts are made operable by mounting them within a strong sheetmetal body part 5, formed to receive and hold each as shown in Figs. 3 and 4. The lower part of this body part is extended to form a lever handle 6, to supplement the lever arm 4. The base piece 1 is held in place by means of rivets 7 which pass loosely through the holes 8 allowing the base piece 1 to adjust itself with the clamping piece 2. The lever arm 4, with the piece 2 pivotally attached thereto at 3, is inserted into the upper part of the body 5 and fixed in place by the fulcrum bolt 9.

The fish tape grip is now complete and the tool is ready for use. The fish tape 10 is to be inserted through the space between the clamping parts 1 and 2, which are made to tightly grip the same by gripping the leverarm handles 4 and 6 with one or both hands. The slight curve of the parts 1 and 2 secures a firm grip on the tape 10 and great force can be applied to pull the tape. It is to be observed that the body part 5 is bent across the end of the tool at 11, so that the workman, while tightly gripping the handle levers 4 and 6 with one hand, can grasp the end of the tool at 11 and apply great pulling force thereto. It is to be further observed that holes 12 are made in the ends of the handles 4 and 6, in which draw links 13 connected with a ring 14 are inserted. By attaching a rope to ring 14 additional force can be applied to the full strength of the fish tape 10.

It is evident that with my invention the fish tape can be pulled to its full capacity. With it a workman can push or pull on the tape 10. By relaxing the grip on the lever handles 4 and 6, the tape is set free to allow the tool to be slipped forward or backward on the tape to secure a new grip thereon. It is to be observed that the body part 5 so encloses the gripping parts that the tape cannot be dislodged and the work can proceed easily and rapidly. The handle 6 is so formed as to practically encircle the tape 10 and the same cannot contact the hands of the workman. This is shown in section in Fig. 4.

My invention is equally useful in pulling wires where such work is required, the application and operation being the same as herein described. For this work the clamping parts 1 and 2 are made with a small longitudinal V-shaped groove, as shown at 15 in section in Fig. 2.

In order to make my invention more useful to the mechanic, a wire cutter 16 is formed on the lever arms 4 and 6. This makes the device handy for cutting small wire when required. A small pipe wrench 17 is also added to make the device useful in twisting one or more wires together. These are useful features of the newly invented gripping tool.

My invention may be made of suitable dimensions for any use required. It can be used in stretching telephone and telegraph wires on pole lines and other places where wire lines are to be constructed.

Having described my invention, I claim—

1. A fish tape grip comprising two gripping parts adjustably mounted between two lever handles, the face of one of said gripping parts being slightly concave and the other convex so formed as to fit and supplement each other, said lever handles pivotally joined at their fulcrum ends near said gripping parts, and said gripping parts and said lever handles so designed as to be in alinement with a fish tape when applied thereto and thereon.

2. A fish tape grip comprising two gripping parts adjustably mounted between two lever handles, one of said gripping parts having a concave and the other a convex gripping face to fit and supplement each other, said lever handles pivotally joined at their fulcrum ends near said gripping parts, said gripping parts and said lever handles so designed as to be in alinement with a fish tape when applied thereon, and one of said lever handles so formed as to loosely encircle the said fish tape and protect the hands from contacting same as described and set forth.

GEORGE MICHELL.